United States Patent
Sakaguchi et al.

[11] Patent Number: 5,848,613
[45] Date of Patent: Dec. 15, 1998

[54] ELECTROMAGNETIC PRESSURE REGULATING VALVE

[75] Inventors: Yoshikazu Sakaguchi, Anjo; Takenori Kano, Toyota; Takeya Oka, Nagoya; Haruki Yamamoto, Gamagori; Kazuhiko Kato, Kariya; Katsuya Tanaka, Anjo; Koichi Ichigo, Hekinan, all of Japan

[73] Assignee: Aisin AW Co., Ltd., Japan

[21] Appl. No.: 692,691

[22] Filed: Aug. 6, 1996

[30] Foreign Application Priority Data

Aug. 11, 1995 [JP] Japan .................................... 7-226033

[51] Int. Cl.⁶ ........................... F15B 13/044; F16K 31/02
[52] U.S. Cl. .................................. 137/625.65; 251/129.16
[58] Field of Search ................ 137/246, 246.12, 137/625.65; 251/129.07, 129.15, 129.16

[56] References Cited

U.S. PATENT DOCUMENTS

| | | | |
|---|---|---|---|
| 2,404,514 | 7/1946 | McClure | 251/129.07 |
| 4,838,313 | 6/1989 | Kobayashi et al. | 137/625.65 |
| 4,838,517 | 6/1989 | Miki et al. | 137/625.65 |
| 4,838,518 | 6/1989 | Kobayashi et al. | 137/625.65 |
| 4,905,961 | 3/1990 | Ichihashi et al. | 137/129.15 |
| 4,971,116 | 11/1990 | Suzuki et al. | 137/625.65 |
| 5,186,204 | 2/1993 | Oka et al. | 137/625.65 |
| 5,197,507 | 3/1993 | Miki et al. | 137/625.65 |
| 5,259,414 | 11/1993 | Suzuki | 137/625.65 |
| 5,467,962 | 11/1995 | Bircann et al. | 251/129.15 |

FOREIGN PATENT DOCUMENTS

| | | |
|---|---|---|
| 3204488 | 9/1991 | Japan . |
| 4-67714 | 6/1992 | Japan . |
| 4027587 | 9/1992 | Japan ................................ 137/625.65 |

*Primary Examiner*—George L. Walton
*Attorney, Agent, or Firm*—Lorusso & Loud

[57] ABSTRACT

An electromagnetic pressure regulating valve includes a hollow core, a coil surrounding the core and a plunger for applying a load to a valve member through a shaft fitted in the hollow of the core, so that the pressure regulating valve is actuated when an electric signal is fed to the coil. A bushing is mounted in the hollow portion of the core for supporting the shaft for sliding relative to the core and is made of a resin material on at least its sliding face contacting the shaft. An oil passage is provided in the valve for circulating a lubricant to lubricate the areas of sliding contact between the bushing and the shaft.

9 Claims, 4 Drawing Sheets

ELECTROMAGNETIC PRESSURE REGULATING VALVE

BACKGROUND OF THE INVENTION

1. Field of the Invention

The present invention relates to a pressure regulating valve and, more particularly, to an electromagnetic pressure regulating valve for applying a load to a valve member by the action of a solenoid.

2. Related Art

The solenoid assembly of an electromagnetic pressure regulating valve of the prior art is composed of: a hollow core having a coil wound thereon; a plunger which moves toward the core, against the load of a return spring, when the coil is electrically energized; and a shaft fixed to the plunger and extending through the hollow bore of the core to the valve member, so as to transmit the displacement of the plunger to the valve member. In the solenoid assembly thus constructed, the shaft should accurately transmit the displacement of the plunger to the valve member. Hence, the shaft is supported by the core through a highly accurate bearing, as disclosed in Japanese Patent Laid-Open No. 204488/1991. In this disclosure, the bearing is exemplified by a linear ball bearing which is composed of a bearing cage made of brass and a number of balls which are rotatably fitted in small holes of small diameter formed in the cage and protruding slightly from the inner and outer surfaces of the bearing case. The shaft, as mounted within the bearing, is supported by the core through the rolling balls so that it can be moved relative to the core with low resistance.

The core is generally made of a soft permeable material (e.g., soft steel such as SUYB1) for enhancing the efficiency of the pressure regulating valve so that a high plunger displacing force may be generated by a small solenoid current and so that the hysteresis may be minimized. If, therefore, the hard bearing balls directly contact the inner surface of the hollow bore of the core, this inner surface will become deformed and the centering accuracy of the shaft and accordingly the plunger will be lost, along with the smooth movement of the shaft. In order to prevent these difficulties, the prior art has adopted a construction in which a sleeve is fitted with the bore of the core. The sleeve is made of a relatively hard steel (e.g., steel having a hardness equal to or higher than that of the balls, as represented by SUJ2) and functions as the outer race of the linear ball bearing. However, such an approach is attended by a high cost, partly because the linear ball bearing itself is expensive and partly because the linear ball bearing has a large number of parts and requires an accordingly large number of assembly steps.

SUMMARY OF THE INVENTION

Therefore, a first object of the present invention is to provide an electromagnetic pressure regulating valve in which the shaft moves smoothly, although supported by a reduced number of parts.

A second object of the present invention is to minimize the use of high cost material in the manufacture of the valve.

A third object of the present invention is to retain the shaft accurately centered while reducing the sliding resistance between the slidably contacting surfaces.

A fourth object of the present invention is to prevent the degradation of the lubricant at the sliding contact surfaces and the formation of products which would inhibit the sliding movement.

A fifth object of the present invention is to provide a simple design for circulation of the lubricant through the sliding surface portions.

In order to achieve the above-specified objects, the present invention provides an electromagnetic pressure regulating valve including a hollow core arranged within a coil and a plunger for applying a load to a valve member through a shaft slidably mounted in the hollow of the core. A bushing is arranged in the hollow of the core for slidably supporting the shaft and is made of a resin material on at least its interior face contacting the shaft. An oil passage is provided for circulating the lubricant around the areas of sliding contact between the bushing and the shaft. The pressure regulating valve is actuated when an electric signal is fed to the coil.

Preferably, only the interior surface of the bushing which contacts the shaft is coated with a resin in order to reduce material costs.

Two bushings may be used, with one bushing arranged at each of the two ends of the bore of the core.

The oil passage provides communication between a space, which is defined by the core, the bushing and the shaft, with another in-valve space containing the lubricant. The oil passage may be formed on the inner surface or on at least one of the bushings and the shaft.

DESCRIPTION OF THE PREFERRED EMBODIMENTS

Figure 1:
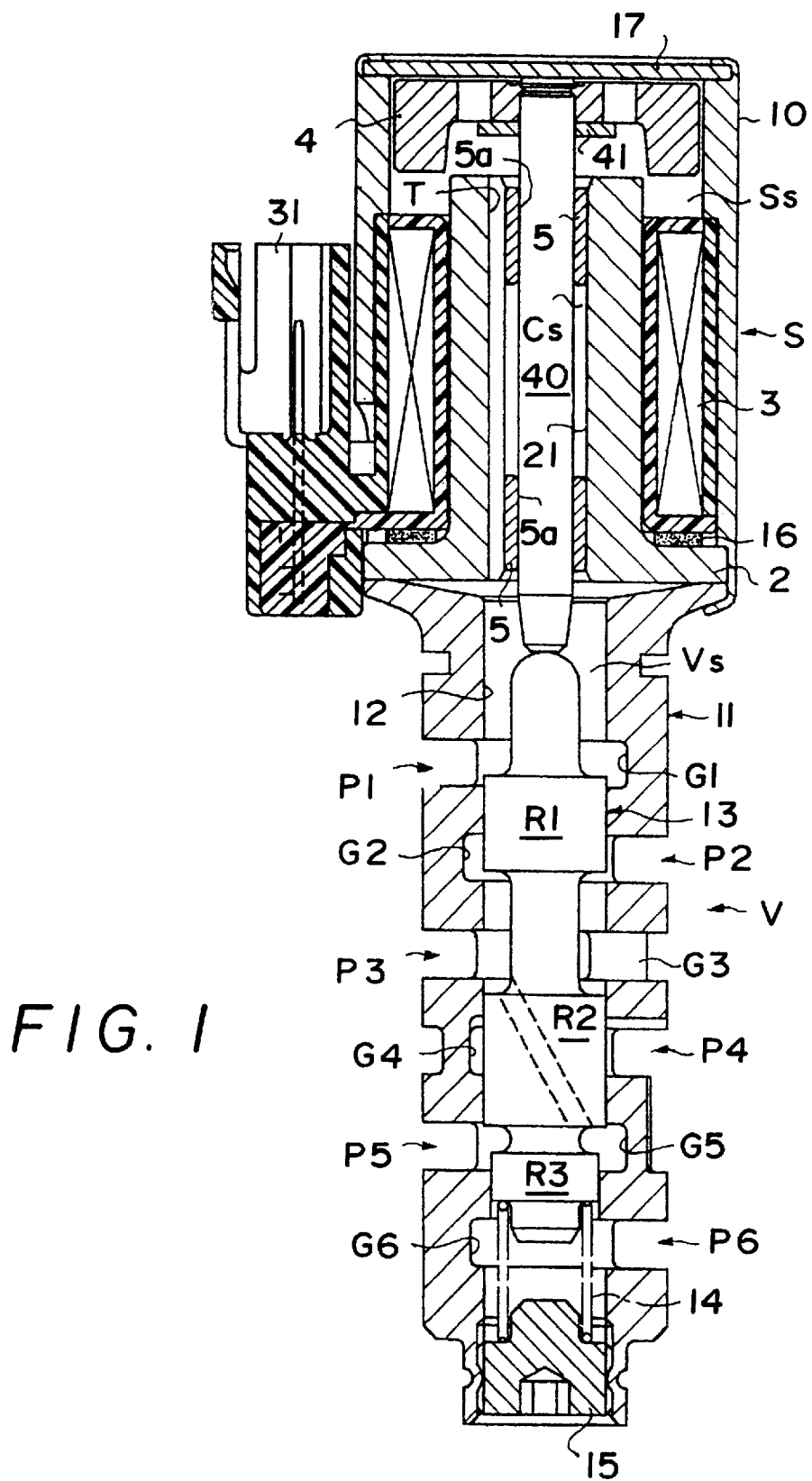
FIG. 1 is a cross-sectional view of an electromagnetic pressure regulating valve according to a first embodiment of the present invention.

FIG. 1 shows the entire construction of an electromagnetic pressure regulating valve according to a first embodiment of the present invention. In this first embodiment, the pressure regulating valve is a linear solenoid valve suitable for use in the hydraulic control system of an automatic transmission. This valve assembly V is fitted in a valve bore formed in the valve body of the automatic transmission, in communication with oil passages also formed in the valve body. A solenoid assembly S is positioned outside of the valve body.

The valve assembly V is composed of a sleeve 11 and a spool 13 slidably mounted within a bore 12 extending axially through the sleeve 11. Sleeve 11 has six ports P1 to P6 axially spaced from one another and circumferential grooves G1 to G6 for providing fluid communication between those ports and the bore 12. The sleeve 11 is shaped such that its end for mounting the solenoid assembly S is radially enlarged whereas its opposite side is relatively radially smaller. The spool 13 has two radially larger lands R1 and R2 and one radially smaller land R3 for providing and blocking the communications between the circumferential grooves G1 to G6 through the bore 12. The terminal end of spool 13 confronting the solenoid assembly S is a stem having its end shaped into a hemisphere which abuts against the shaft of the solenoid assembly S. At the opposite end of bore 12 is mounted a return spring 14, which is held in a compressed state with its one end abutting against the radially small land R3 of the spool 13 and its other end abutting against a screw plug 15. This screw plug 15 is screwed into the threaded portion of the extension of the bore 12 until it is fixed in a position to apply a predetermined return load to the spool 13 and then fixed relative to the sleeve 11.

The solenoid assembly S is composed of: a core 2 having a radially enlarged portion abutting against the radially enlarged axial end of the sleeve 11 and fixed to the sleeve 11 by crimping (bending over) the end portion of solenoid case 10. A coil 3 is mounted in the case 10 surrounding the core 2. A plunger 4 is slidably mounted in case 10 at the end of the core 2 and is fixed to a shaft 40 for movement therewith. A filter 16 acts as a damper to prevent the coil from moving. A spacer 41, made of a non-magnetic material such as brass, serves to retain a minimum gap between the core 2 and the plunger 4. Also in FIG. 1, numeral 17 designates a plate covering the opening of the case 10; and numeral 31 designates a socket of a connector plug for connecting the coil 3 with an electronic control system (not shown).

In the bore 21 of the core 2, according to the present invention, there are two bushings 5 for slidably supporting and guiding the shaft 40 slidably in the core 2. In this embodiment, at least the interior surface 5a of the bushing 5 which contacts and supports the shaft 40 is made of a low-friction synthetic resin such as polytetrafluoroethylene (PTFE). For example, the bushing 5 may be made of steel and lined on its inner surface with a coating of PTFE. The bushings 5 are arranged at opposite ends of the bore 21 of the core 2.

In the valve thus constructed, there is formed an oil passage T for circulation of a lubricant between the bushings 5 and the shaft 40. This oil passage T provides communication between a space Cs, as defined by the core 2, the bushings 5 and the shaft 40, and other in-valve spaces Vs and Ss holding the lubricant, as will be described in more detail below.

Figure 2:
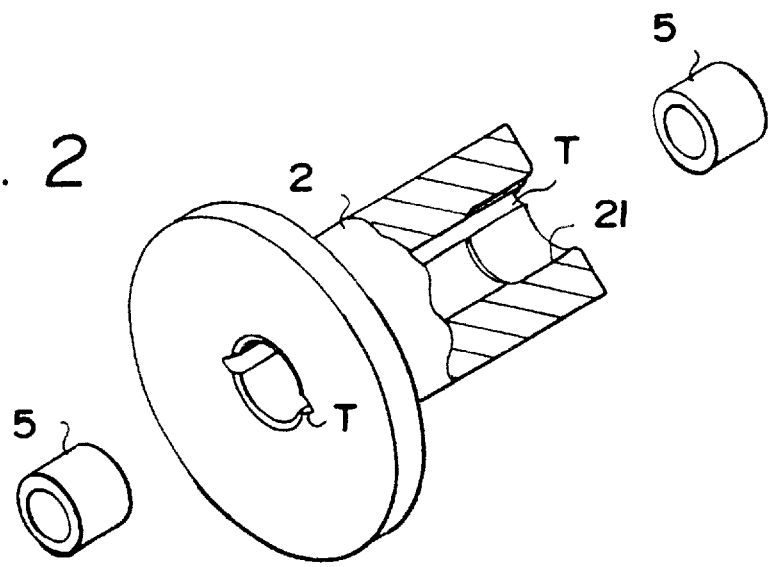
FIG. 2 is an exploded perspective view showing a core portion of the pressure regulating valve of FIG. 1 in cross-section.

As shown in detail in FIG. 2, presenting the core and bushing in an exploded view, the oil passage is formed in bore 21, in this embodiment, as a pair of grooves T, each having a "V-shaped" section. As also seen in FIG. 2, the bore is stepped to form two radially enlarged end portions for receiving the bushings, and the grooves T axially extend, in parallel, over the entire length of the core 2, diametrically opposed to each other.

In the linear solenoid valve thus constructed according to the first embodiment, the spool 13 is positioned at one extreme (retracted position), as shown in FIG. 1, by the load of the return spring 14 when there is no solenoid current. In this position, the output port P3 communicates with the drain port P2 so that the base pressure (i.e., the modulator pressure which is reduced from the line pressure by the modulator valve to an extent where it can be regulated with high accuracy within the range of the spool of the linear solenoid valve), as fed from the port P4, is blocked by the land R2.

When an electric current of a duty ratio determined by the electronic control system (not shown) is fed to the coil 3 of the linear solenoid valve, the plunger 4 is attracted toward the core 2 by the electromagnetic force to extend the shaft 40, thereby moving the spool 13 against the force of the spring 14.

As the spool 13 is thus moved downward in FIG. 1 the base pressure, as fed from the port P4, is throttled by the land R2 to a predetermined level and output at the port P3. The output pressure at this time is fed back as a secondary pressure to the step face of the land R2 through the in-spool oil passage so that the pressure output at port P3 is held at a predetermined level by the balance between the solenoid load, the spring load and the feedback pressure load.

As a result of the displacement of the shaft 40 in the above-described operations, the capacity of the space Ss in the case 10 confining the plunger 4 increases by a volume corresponding to the volume of the length of shaft 40 entering into the in-valve space Vs (=volume of shaft exiting Ss). Thus, the pressure in the space Ss of the case 10 drops so that the oil in the in-valve space Vs is sucked into the space Ss by way of the bore 21 of the core 2, namely, through the groove T. This flow of oil entrains the oil in the space Cs which is defined between the two bushings 5. When the shaft 40 is moved upward in the drawing, on the other hand, the capacity of the space Ss decreases by the volume corresponding to the volume of the length of shaft 40 entering Ss. As a result, the pressure in the space Ss rises to force the oil of the space Ss out into the space Vs via the groove T of the core 2. Thus, the oil in the space Cs is always delivered either to the space Vs or the space Ss by the displacement of the shaft 40, in operation of the linear solenoid valve for a changing of the duty ratio by the electronic control system and for regulating the output pressure at the predetermined level.

Thus, according to this embodiment, the lubricant for lubricating the shaft supporting portions is continuously circulated by the displacement of the shaft 40. Thus, local degradation of the lubricant, which might otherwise be caused by the stagnation of the lubricant between the bushing 5 and the shaft 40 and by the repeated motion of the shaft 40, is prevented. The production of carbon deposits, which might otherwise be produced is also avoided. As a result, the shaft 40 can smoothly slide. Moreover, the bushing 5 is coated on its inner surface with PTFE to minimize use of the expensive PTFE and to thereby provide the bushing 5 at a reasonable cost. Moreover, because a bushing 5 is arranged at each of the two ends of the bore 21 the area of sliding contact with the shaft 40 and the sliding resistance of the shaft 40 are minimized to thereby ensure the smooth sliding movement of the shaft 40. Furthermore, the shaft 40 is free of any chattering because it is supported in the vicinities of its two ends.

Figure 3:
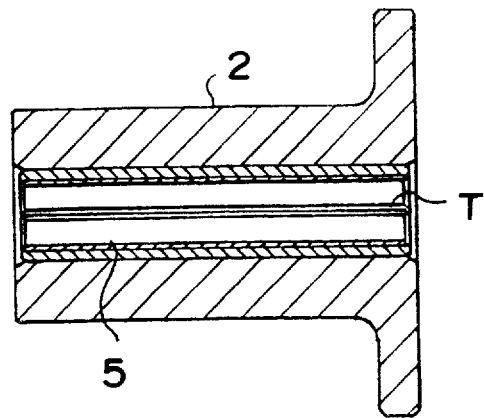
FIG. 3 is a cross-sectional view of a core portion of an electromagnetic pressure regulating valve according to a second embodiment of the present invention.

A second embodiment is shown in FIG. 3. In this second embodiment, the bushing 5 is so constructed that it extends substantially the entire length of the core 2. Although the core 2 may have the groove T as in the foregoing embodiment, the grooves T in this embodiment are parallel grooves which axially extend along the inner surface of the bushing 5, diametrically opposing each other. This second mode is less advantageous than the first embodiment, in terms of the sliding resistance, because the sliding contact area between the shaft 40 and the bushings 5 is enlarged, but it is more advantageous than the first embodiment in terms of a smoother flow of the lubricant and avoidance of valve sticking.

Figure 4:
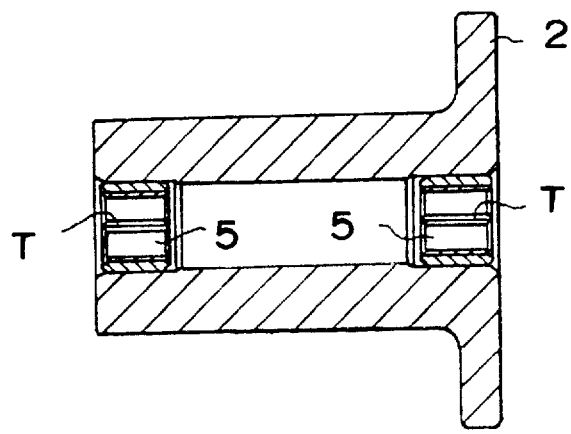
FIG. 4 is a cross-sectional view of a core portion of an electromagnetic pressure regulating valve according to a third embodiment of the present invention.

FIG. 4 shows a third embodiment in which the bushings 5 are formed as short cylinders and are inserted at each of the two end portions of the bore 21 of the core 2. The grooves T are formed, as in the foregoing embodiment, as parallel grooves which axially extend along the inner surface of the bushing 5, diametrically opposed to each other. This embodiment is advantageous both for reduction of the area of sliding contact and the prevention of sticking, thus combining the advantages of the foregoing two embodiments.

Figure 5:
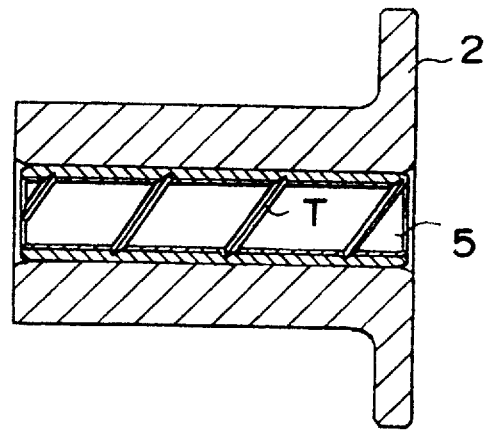
FIG. 5 is a cross-sectional view of a core portion of an electromagnetic pressure regulating valve according to a fourth embodiment of the present invention.

FIG. 5 shows a fourth embodiment, in which the bushing 5 extends substantially the entire length of the core 2, as in the second embodiment. However, in this embodiment, the groove T is formed into a spiral (may be a plurality of spiral grooves, although only one is shown) which extends along the inner surface of the bushing 5. This embodiment is more advantageous than the foregoing embodiments from the viewpoint on increasing flow velocity of the lubricant.

Figure 6:
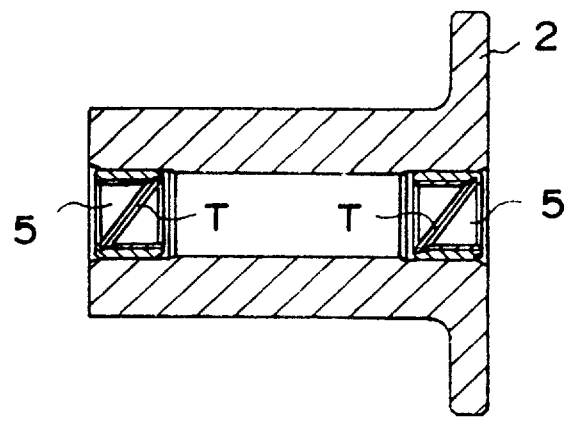
FIG. 6 is a cross-sectional view of a core portion of an electromagnetic pressure regulating valve according to a fifth embodiment of the present invention.

FIG. 6 shows a fifth embodiment in which the bushings are formed as short cylinders, as in the third embodiment, and are inserted in each of the two ends of the bore 21 of the core 2. However, in this embodiment the groove T is formed, as in the fourth embodiment, into a single spiral which extends along the inner surface of the bushing 5.

Figure 7:
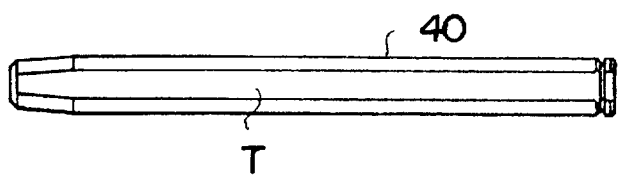
FIG. 7 is a cross-sectional view of a shaft of an electromagnetic pressure regulating valve according to a sixth embodiment of the present invention.

FIG. 7 shows a sixth embodiment in which the groove T is formed in the outer surface of the shaft 40, unlike the foregoing embodiments. This groove T is formed by forming axial cuts along the shaft 40 at diametrically opposite locations. This embodiment is more advantageous than the foregoing embodiments in terms of machinability because a steel cylinder is more easily machined on its outer surface than a hollow cylinder can be machined on its inner surface.

Figure 8:
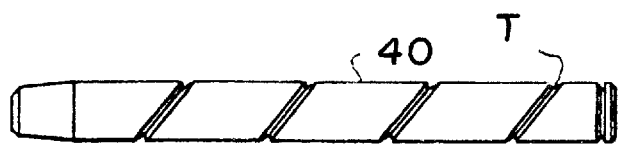
FIG. 8 is a cross-sectional view of a shaft of an electromagnetic pressure regulating valve according to a seventh embodiment of the present invention.

FIG. 8 shows a seventh embodiment in which the groove T, like the sixth embodiment, is formed on the outer surface of the shaft 40. However, in this seventh embodiment the groove T is formed as a single spiral groove which extends along the outer surface of the shaft 40. This embodiment is more advantageous, compared to the first to fifth embodiments, because the groove T is formed by machining the outer surface. While this embodiment is slightly less advantageous in this regard as compared to the sixth embodiment, it is more advantageous in terms of the flow of the lubricant.

Even if the electromagnetic pressure regulating valve of any of the foregoing first through seventh embodiments is used in a hot environment for a long time, the flow of the lubricant around the sliding contacts between the bushing 5 and the shaft 40 is retained by flow of lubricant through the groove T. As a result, it is possible to prevent degradation of the lubricant which might otherwise occur due to local stagnation of the lubricant and to prevent sticking between bushing 5 and the shaft 40. Thus, the shaft 40 sufficiently slidable in the bushing(s) 5 is to ensure accuracy in regulating the oil pressure. As described hereinbefore, the lubricant can be fed to and released from the sliding contacts by the reciprocation of the shaft 40 so that no special pressure source is required for flow of the lubricant. Moreover, if oil flow is provided by the groove T, resistance to the plunger 4 by the oil is less than that in the prior art due to flow of the lubricant into and out of the solenoid case 10 via the groove T, so that better responsiveness of the linear solenoid valve is provided.

As noted above, in the present invention a bushing having a resin lining is used to slidably support the shaft. In place of the sleeve and the linear ball bearing of the prior art, the present invention employs only the resin-lined bushing, so that the number of parts and the number of assembly steps are reduced and the cost of the pressure regulating valve is lowered. Moreover, since the lubricant for lubricating the bushing and the shaft is circulated through the areas of sliding contact, it will not stagnate between the bushings and the shaft. Even if the pressure regulating valve is operated in a hot environment resulting from the heat generation by the coil, it is possible to maintain the lubricating performance, which might otherwise suffer due to local deterioration of the lubricant. It is also possible to prevent the production of carbon-containing residues from the lubricant which might otherwise cause sticking. Thus, the smooth sliding movement of the shaft can be retained for a long time so that highly accurate pressure regulation by the pressure regulating valve can also be retained for a long time.

With only the sliding face of the bushing formed of the resin coating, the use of the expensive resin can be minimized to provide a bushing affording the shaft smooth sliding support at a reasonable cost.

In those embodiments where two, relatively short bushings are arranged at opposite ends of the inner surface of the core, the area of sliding contact between the bushings and the shaft can be reduced, thereby lowering the sliding resistance for the shaft. Since the shaft is supported near its two end portions, its axial position and inclination can be maintained with high accuracy without any chattering. Moreover, the material for forming the bushing can be reduced to lower the cost.

Further, the space, as defined by the core, the bushing and the shaft, communicates with another in-valve space containing the lubricant by way of the oil passage so that the lubricant can be circulated between those spaces to prevent local degradation of the lubricant.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electromagnetic pressure regulating valve comprising:

a valve sleeve and a valve member slidably mounted in said valve sleeve for regulating the pressure of an oil fed thereto;

a hollow core having an interior surface defining a bore extending therethrough;

a coil surrounding said core;

a shaft abutting said valve member, said shaft having an outer cylindrical surface and being slidably mounted in said bore;

a plunger fixed to said shaft, said plunger being drawn in a first direction, toward said core, responsive to receipt of electric current by said coil, thereby extending said shaft;

biasing means for biasing said plunger in a second direction, opposite said first direction;

a bushing mounted in said bore for supporting said shaft, said bushing having an inner cylindrical surface formed of a resinous material and in mating, sliding contact with said outer cylindrical surface of said shaft;

a case housing said plunger, said hollow core and said coil;

a first oil space defined between said case and said core at one end of said core;

a second oil space defined by said valve sleeve at an end of said core opposite said one end; and an oil passage for circulating a lubricant between said first and second oil spaces, across the length of said bushing and through an area between said bushing and said shaft.

2. An electromagnetic pressure regulating valve according to claim 1, wherein said bushing comprises a hollow cylinder and a liner of said resinous material, within said hollow cylinder, defining said inner cylinder surface.

3. An electromagnetic pressure regulating valve according to claim 1, comprising two of said bushings, one bushing being inserted in each of opposing ends of the bore of said core, with a gap between said two bushings forming a third oil space through which lubricant passes in circulation between said first and second oil spaces.

4. An electromagnetic pressure regulating valve according to claim 1, wherein said oil passage is a groove on the interior surface of said core.

5. An electromagnetic pressure regulating valve according to claim 4, wherein said groove extends axially along said interior surface, parallel to said shaft.

6. An electromagnetic pressure regulating valve according to claim 4, wherein said groove is a spiral groove.

7. An electromagnetic pressure regulating valve according to claim 4, wherein said oil passage comprises two grooves diametrically opposite each other and extending axially along said interior surface, parallel to said shaft.

8. An electromagnetic pressure regulating valve according to claim 1, wherein said oil passage is a groove in at least one of said inner cylindrical surface of said bushing and said outer cylindrical surface of said shaft.

9. An electromagnetic pressure regulating valve according to claim 1, wherein said plunger has a plurality of apertures extending axially therethrough to permit oil within said first space to pass through said plunger upon movement of said plunger.

* * * * *